United States Patent
Sanchez et al.

(10) Patent No.: US 10,419,878 B1
(45) Date of Patent: Sep. 17, 2019

(54) TECHNOLOGY FOR CAPTURING AND ANALYZING SENSOR DATA TO FACILITATE ALTERNATIVE TRANSPORTATION

(71) Applicant: BLUEOWL, LLC, San Francisco, CA (US)

(72) Inventors: Kenneth J. Sanchez, San Francisco, CA (US); Eric Dahl, Newman Lake, WA (US); Steven J. Harris, Saratoga, CA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

(21) Appl. No.: 15/658,031

(22) Filed: Jul. 24, 2017

(51) Int. Cl.
*H04W 4/02* (2018.01)
*G08B 21/02* (2006.01)
*G08G 1/123* (2006.01)

(52) U.S. Cl.
CPC ............ *H04W 4/023* (2013.01); *G08B 21/02* (2013.01); *G08G 1/123* (2013.01)

(58) Field of Classification Search
CPC ........ G08G 1/123; G08G 1/127; G08G 1/133; G08G 1/144; G08G 1/096855; G08G 1/096861; G08G 1/096866; G08B 21/06; G08B 21/10; G08B 21/0438; G08B 21/0492; G08B 21/02; B60K 28/06; B60K 28/02; B60K 28/063; B60K 28/00; H04W 4/029; H04W 4/027; H04W 4/02; H04W 4/025; H04W 12/00503; H04W 4/44; H04W 4/021; H04W 4/024; H04W 8/18; H04W 8/22; G06Q 2250/10; G06Q 2240/00; G06Q 50/30; G06Q 50/10; G06Q 50/00; G06Q 50/12; G06Q 30/0207; G06Q 30/0227; G06K 9/00348; G06K 9/00342; G06K 9/00335; G06K 9/00845
See application file for complete search history.

(56) References Cited

U.S. PATENT DOCUMENTS

| | | | |
|---|---|---|---|
| 8,768,626 B1 * | 7/2014 | Ganesh | G01C 21/3484 701/540 |
| 9,426,660 B2 * | 8/2016 | McCormack | H04W 12/08 |
| 9,809,169 B1 * | 11/2017 | Naboulsi | B60R 1/025 |
| 2011/0169603 A1 * | 7/2011 | Fithian | G06Q 10/00 340/5.52 |
| 2013/0054090 A1 * | 2/2013 | Shin | B60K 28/06 701/36 |
| 2014/0058896 A1 * | 2/2014 | Jung | G06Q 30/0623 705/26.61 |
| 2014/0062722 A1 * | 3/2014 | Ofir | G01N 27/26 340/870.02 |

(Continued)

*Primary Examiner* — Meless N Zewdu
(74) *Attorney, Agent, or Firm* — Marshall, Gerstein & Borun LLP; Randall G. Rueth

(57) ABSTRACT

Systems and methods for using sensor data to assess impairment of individuals and dynamically facilitate alternative transportation for the individuals are described. According to certain aspects, an electronic device may collect movement data of an individual and compare the movement data to baseline movement data to estimate an impairment level of the individual. The electronic device may generate and display messages for the individual to review, and may interface with a remote server to facilitate the arrangement of alternative transportation for the individual.

20 Claims, 5 Drawing Sheets

(56) References Cited

U.S. PATENT DOCUMENTS

| | | | | |
|---|---|---|---|---|
| 2014/0163848 A1* | 6/2014 | Tamir | ............... | G06Q 30/0283 |
| | | | | 701/117 |
| 2014/0214500 A1* | 7/2014 | Hudson | ............. | G06Q 30/0284 |
| | | | | 705/13 |
| 2014/0240132 A1* | 8/2014 | Bychkov | ................. | A61B 5/18 |
| | | | | 340/576 |
| 2015/0281880 A1* | 10/2015 | Song | ...................... | H04B 7/26 |
| | | | | 455/41.2 |
| 2015/0323334 A1* | 11/2015 | Lord | .................... | G06Q 10/06 |
| | | | | 701/400 |
| 2016/0318521 A1* | 11/2016 | Nothacker | ........... | B60W 40/08 |
| 2017/0293950 A1* | 10/2017 | Rathod | ............. | G06Q 30/0283 |
| 2018/0004926 A1* | 1/2018 | Huxham | .................. | G06F 1/16 |
| 2018/0156623 A1* | 6/2018 | West | ............... | G01C 21/3423 |

\* cited by examiner

TECHNOLOGY FOR CAPTURING AND ANALYZING SENSOR DATA TO FACILITATE ALTERNATIVE TRANSPORTATION

TECHNICAL FIELD

The present disclosure is directed to capturing and analyzing sensor data to assess individual impairment. More particularly, the present disclosure is directed to systems and methods of using sensor data to assess impairment of individuals and dynamically facilitate alternative transportation for the individuals.

BACKGROUND

There are serious risks associated with operating vehicles while under the influence of certain substances or otherwise impaired, both to vehicle operators and to other individuals who may be affected by operation of the vehicle. This is a known problem yet individuals sometimes ignore these risks and choose to operate vehicles. For example, a bar patron who is intoxicated may drive home after leaving the bar. There are various devices that are equipped to detect certain types of impairment. For example, a vehicle may be equipped with a breathalyzer device configured to capture an individual's blood alcohol content (BAC).

However, these devices are limited in their detection capabilities, if the devices are even present and used in a given vehicle. In particular, these devices are only able to detect certain types of impairment using limited metrics. Accordingly, there is an opportunity for systems and methods to leverage certain electronic device components to capture data, analyze the data, and facilitate appropriate action in the case of operator impairment.

SUMMARY

In an embodiment, a computer-implemented method in an electronic device of facilitating transportation is provided. The method may include identifying a location of the electronic device, determining, based on the location of the electronic device, that the electronic device is located in proximity to a venue of a certain type, accessing (i) movement data from at least one sensor of the electronic device and (ii) baseline movement data associated with a user of the electronic device, and determining that the movement data deviates from the baseline movement data. Further, the method may include, in response to determining that the movement data deviates from the baseline movement data, generating a message indicating an availability of alternative transportation, and displaying the message in a user interface of the electronic device In another embodiment, an electronic device for facilitating transportation is provided. The electronic device may include a location module configured to generate location data, a set of sensors configured to generate movement data, a user interface, a memory configured to store non-transitory computer executable instructions and baseline movement data associated with a user of the electronic device, and a processor interfacing with the set of sensors and the memory. The processor is configured to execute the non-transitory computer executable instructions to cause the processor to identify, from the location data generated by the location module, a location of the electronic device, determine, based on the location of the electronic device, that the electronic device is located in proximity to a venue of a certain type, access (i) the movement data from the set of sensors and (ii) the baseline movement data, determine that the movement data deviates from the baseline movement data, in response to determining that the movement data deviates from the baseline movement data, generate a message indicating an availability of alternative transportation, and cause the user interface to display the message.

DETAILED DESCRIPTION

Figure 1:
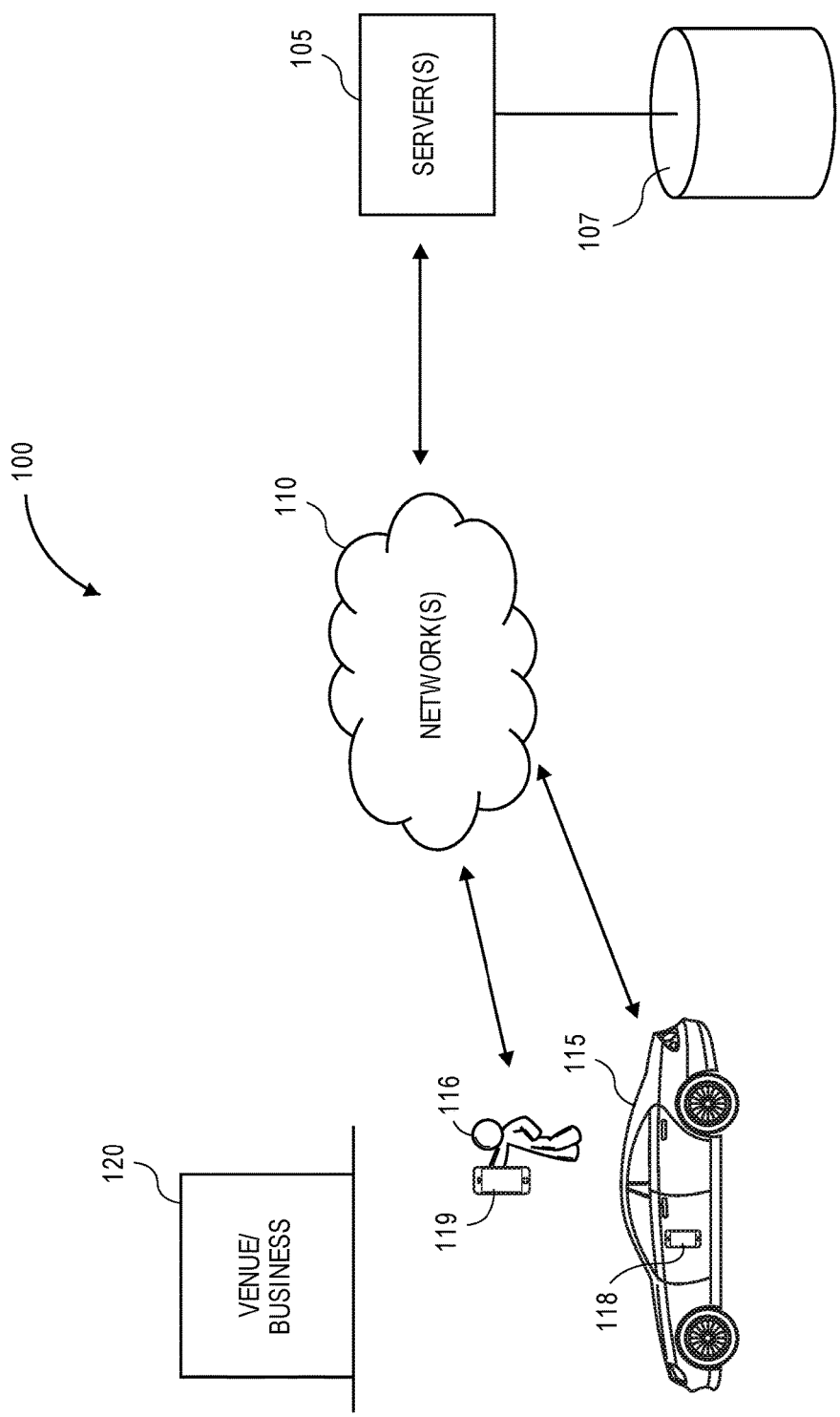
FIG. 1 depicts an exemplary diagram of the system and components thereof capable of facilitating the systems and methods, in accordance with some embodiments.

The present embodiments may relate to, inter alia, collecting and analyzing sensor data associated with an individual to assess impairment of the individual, and facilitating alternative transportation for the individual. According to certain aspects, an electronic device may determine, based on location data, whether an individual is located at or in proximity to a particular type of venue or event, and whether the individual intends to operate a vehicle. Further, the electronic device may retrieve various types of movement data and optionally a set of telematics data from a set of sensors, and estimate a level of impairment based on the retrieved data. If the level of impairment exceeds a certain threshold, the electronic device may generate and display messages for the individual to review, where the messages may dissuade the individual from operating a vehicle. Further, the electronic device may facilitate alternative transportation for the individual to be transported to his or her destination.

The systems and methods therefore offer numerous benefits. In particular, the systems and methods improve the safety of the individual as well as any other individuals who may otherwise be involved in or in proximity to operation of the vehicle by the individual. Further, the saved costs associated with accident prevention will make ownership and use of a vehicle more affordable. Moreover, the systems and methods may increase business for providers of alternate transportation, such as ride share services and public transportation providers. It should be appreciated that additional benefits of the systems and methods are envisioned.

The systems and methods discussed herein address a challenge that is particular to managing vehicle operation. In particular, the challenge relates to a difficulty assessing when individuals should not operate vehicles. Conventional products, such as a breathalyzer, are limited in the metrics they measure (e.g., an individual's blood alcohol content (BAC)), and are not able to dissuade vehicle operation or facilitate alternative transportation. The systems and methods offer improved capabilities to solve these problems by accessing and analyzing data from multiple sources, including device and vehicle sensors, analyzing the data to assess levels of impairment, and communicating messages to the individuals and/or facilitating alternative transportation for the individuals. Further, because the systems and methods employ the collection, analysis, and transmission of data associated with devices and vehicles, the systems and methods are necessarily rooted in computer technology in order to overcome the noted shortcomings that specifically arise in the realm of managing vehicle operation.

Similarly, the systems and methods provide improvements in a technical field, namely, data compiling and analyzing. Instead of the systems and methods merely being performed by hardware components using basic functions, the systems and methods employ complex steps that go beyond the mere concept of simply retrieving and combining data using a computer. In particular, the hardware components capture individual movement data and vehicle telematics data, analyze the captured data to assess levels of impairment, generate and display electronic messages, and communicate with backend servers, among other functionalities.

According to implementations, the systems and methods may support a dynamic, real-time or near-real-time analysis of any captured, received, and/or detected data. In particular, the electronic device may receive or capture movement and telematics data in real-time or near real-time, and may automatically and dynamically analyze the captured data in real-time or near real-time. The electronic device may also automatically and dynamically generate and communicate relevant notifications and messages, and communicate with various backend servers. In this regard, the individuals are afforded the benefit of accurate and relevant data.

FIG. 1 illustrates an overview of a system 100 of components configured to facilitate the systems and methods. It should be appreciated that the system 100 is merely exemplary and that alternative or additional components are envisioned.

As illustrated in FIG. 1, the system 100 depicts a vehicle 115. Although FIG. 1 depicts a single vehicle, it should be appreciated that additional vehicles are envisioned. The vehicle 115 may have at least one associated individual 116, such as an operator and/or a passenger of the vehicle 115. Further, the vehicle 115 may have an associated electronic device 118. According to embodiments, the electronic device 118 may be configured with any combination of software and hardware components. In some implementations, the electronic device 118 may be included as part of an on-board diagnostic (OBD) system or any other type of system configured to be installed in the vehicle 115, such as an original equipment manufacturer (OEM) system.

The individual 116 may also be equipped with or able to access an electronic device 119. In particular, the electronic device 119 (and the electronic device 118) may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistants), pager, computing device configured for wireless communication, and/or the like. The electronic device 119 may be equipped to connect to and communicate with the electronic device 118 via a wired or wireless connection. In an implementation, the electronic device 119 and the electronic device 118 may be combined into a single electronic device.

The electronic device 119 may be configured with a set of sensors that may generate data associated with movement of the electronic device 119. In particular, the movement data may be generated by any combination of one or more accelerometers, gyro sensors, force sensors, strain gauges, inclinometers, goniometers, and/or other sensors. Generally, the generated movement data may be reflective of movement of the individual 116, as the individual 116 may carry or otherwise possess the electronic device 119 while moving (e.g., walking, jogging, or the like). In an implementation, the movement data may be reflective of a gait profile of the individual 116.

The electronic device 118, as well as the electronic device 119, may include a set of sensors configured to detect and record various telematics data associated with the vehicle 115. In some implementations, the electronic devices 118, 119 may be configured to communicate with (i.e., request, retrieve, or receive data from) a set of sensors disposed within the respective vehicle 115. According to embodiments, the set of sensors included in the electronic devices 118, 119 or otherwise configured to communicate with the electronic devices 118, 119 may be of various types. For example, the set of sensors may include a location module (e.g., a global positioning system (GPS) chip), an image sensor, an accelerometer, an ignition sensor, a clock, speedometer, a torque sensor, a throttle position sensor, a compass, a yaw rate sensor, a tilt sensor, a steering angle sensor, a brake sensor, and/or other sensors. It should be appreciated that additional sensors are envisioned.

The individual 116 may be a customer, visitor, or patron of a venue/business 120. In embodiments, the venue/business 120 may be any permanent or temporary facility or structure capable of being visited by the individual 116. For example, the venue/business 120 may be a bar, restaurant, coffee shop, concert venue, sports stadium, and/or the like. The venue/business 120 may have an associated location (e.g., GPS coordinates), business hours, and/or other associated data.

The system 100 may further include one or more servers 105 that may be configured to communicate with the electronic devices 118, 119 via one or more networks 110. In certain embodiments, the network(s) 110 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The server 105 may be configured to interface with or support a memory or storage 107 capable of storing various data. In particular, the memory 107 may store information related to venues or businesses such as the venue/business 120; baseline movement data associated with individuals such as the individual 116; and baseline telematics data associated with vehicles such as the vehicle 115, among other data. In embodiments, the server 105 may be associated with operation of a transportation service. For example, the server 105 may be operated by a ride sharing service, a public transportation service, and/or another transportation service.

According to embodiments, the components of the system 100 may determine or detect circumstances in which it may be unsafe for the individual 116 to operate the vehicle 115. In particular, the electronic device 119 may interface with the server 105 to determine that the electronic device 119 (and by extension, the individual 116) may be located at or in proximity to the venue/business 120, where the venue/business 120 may be one that may cause the individual 116 to achieve an impaired state. For example, the electronic device 119 may determine that it is located within a bar. The electronic device 119 may also collect movement data from a set of sensors to determine whether movement of the individual 116 is unusual or differs from normal or baseline movement. In some scenarios, the electronic device 119 may collect telematics data associated with operation of the vehicle 115, or the electronic device 119 may interface with the electronic device 118 that may collected telematics data associated with operation of the vehicle 115.

Based on the movement data and optionally on the telematics data, the electronic device 119 may determine that the individual 116 may be impaired and, therefore, there is an elevated risk associated with the individual 116 operating the vehicle 115. Accordingly, the electronic device 119 may generate and display a notification or message that encourages the individual 116 to refrain from operating the vehicle. In some embodiments, the electronic device 119 may facilitate alternative transportation for the individual 116, such as by interfacing with the server 105 to request a ride share service. Additional functionality is described herein with respect to FIG. 2.

Figure 2:
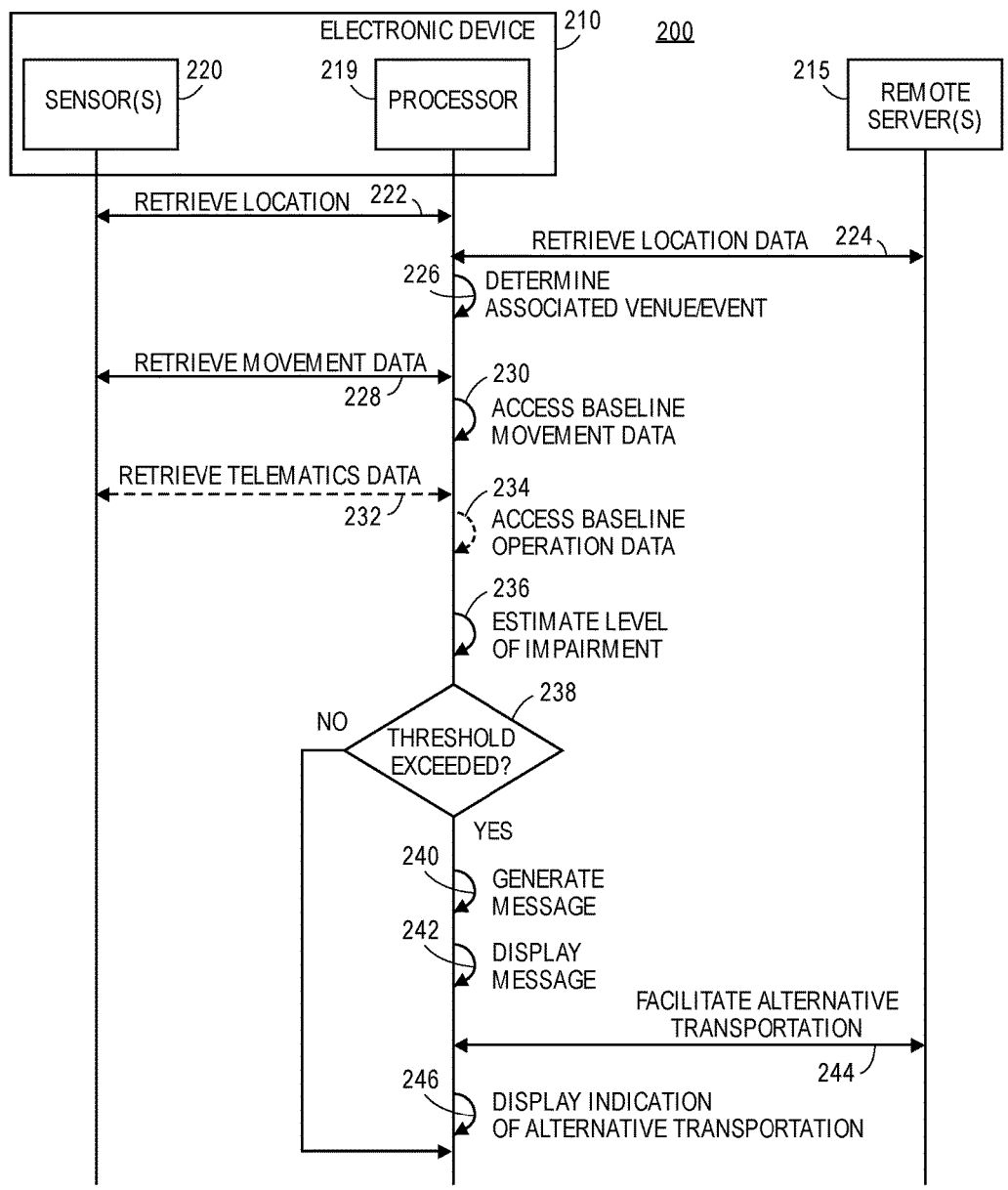
FIG. 2 depicts an exemplary signal diagram associated with collecting and analyzing sensor data, and facilitating alternative transportation, in accordance with some embodiments.

FIG. 2 depicts a signal diagram 200 associated with facilitating certain functionalities associated with the systems and methods. The signal diagram 200 includes a set of sensors 220, a processor 219, and at least one remote server 215 (such as the server(s) 105 as discussed with respect to FIG. 1). The set of sensors 220 and the processor 219 may be included as part of an electronic device 210, such as the electronic device 119 as discussed with respect to FIG. 1, where the electronic device 210 may have a user, such as the individual 116 as discussed with respect to FIG. 1. It should be appreciated that additional or alternative components and devices are envisioned.

The signal diagram 200 may begin when the processor 219 retrieves (222) a location from one of the set of sensors 220. In embodiments, the processor 219 may retrieve the location from a GPS module, where the location may be in the form of GPS coordinates and the location may be reflective of the location of the electronic device 210. The processor 219 may interface with the at least one remote server 215 to retrieve (224) location data associated with the location retrieved in (222). In embodiments, the location data may indicate venues, businesses, buildings, events, landmarks, and/or the like that may be nearby or in proximity to, or otherwise associated with, the location retrieved in (222). For example, the location data may indicate a bar that corresponds to the location of the electronic device 210. For further example, the location data may indicate an outdoor festival that corresponds to the location of the electronic device 210. In one implementation, the processor 219 may examine the location data to determine (226) a venue, event, or the like that corresponds to the location of the electronic device 210, and may deem that the electronic device 210 is located at or near the determined venue, event, or the like.

The processor 219 may additionally retrieve (228) movement data from at least one of the set of sensors 220. According to embodiments, the movement data may be any type of data associated with qualities that may characterize human locomotion or movement. The movement data may be commonly used in a gait analysis. Further, the movement data may be generated by any combination of one or more accelerometers, gyrosensors, force sensors, strain gauges, inclinometers, goniometers, and/or other sensors that may generate data associated with human locomotion or movement.

The processor 219 may access (230) baseline movement data that may be in the form of a walking profile associated with the user of the electronic device. The processor 219 may access the walking profile from local memory or may retrieve the walking profile from one of the remote server(s) 215. In embodiments, the walking profile may include baseline movement data generated by any combination of one or more accelerometers, gyrosensors, force sensors, strain gauges, inclinometers, goniometers, and/or other sensors that may generate data associated with human locomotion or movement, where the baseline data may be reflective of a "normal" gait or movement of the user. In embodiments, the baseline movement data of the walking profile may have been previously collected and stored.

In an optional implementation, the processor 219 may retrieve (232) telematics data from at least one of the set of sensors 220, where the telematics data may be reflective of operation of a vehicle. In particular, the processor 219 may retrieve the telematics data from one or more sensors associated with the vehicle during operation of the vehicle, such as a location module (e.g., a GPS chip), an image sensor, an accelerometer, an ignition sensor, a clock, speedometer, a torque sensor, a throttle position sensor, a compass, a yaw rate sensor, a tilt sensor, a steering angle sensor, a brake sensor, and/or other sensors. In an implementation, the processor 219 may retrieve the telematics data from another electronic device (not shown in FIG. 2; e.g., an OBD of a vehicle) via a wired or wireless connection).

In the optional implementation, the processor 219 may also access (234) baseline operation data associated with the user of the electronic device. The processor 219 may access the baseline operation data from local memory or may retrieve the baseline operation data from one of the remote server(s) 215. In embodiments, the baseline operation data may include any combination of telematics data detectable by any combination of sensors, such as any sensor as discussed herein, where the baseline operation data may be reflective of "normal" operation of the vehicle by the user. In embodiments, the baseline operation data may have been previously collected and stored.

The processor 219 may estimate (236) a level of impairment of the user. In particular, the processor 219 may estimate the level of impairment based on any combination of the movement data, the walking profile, the driving data, and the baseline driving data. In an implementation, the processor 219 may compare the movement data retrieved in (228) to the baseline movement data of the walking profile to determine any differences, degrees of the differences, discrepancies, or any other data that may indicate a difference in the user's current movement as compared to the user's normal movement. Additionally or alternatively, the processor 219 may compare the telematics data retrieved in (232) to the baseline operation data to determine any differences, degrees of the differences, discrepancies, or any other data that may indicate a difference in the user's current vehicle operation as compared to the user's normal vehicle operation. Generally, in estimating the level of impairment, the processor 219 may compare the movement data to the baseline movement data (and optionally the telematics data to the baseline operation data) to determine a deviation level, and calculate, based on the deviation level, an estimated impairment level of the user of the electronic device. It should be appreciated that the processor 219 may employ any type of calculation, algorithm, analysis, technique, or the like when comparing or analyzing the data.

Accordingly, the level of impairment estimated by the processor 219 may be reflective of the comparison(s), and specifically reflective of any differences between the movement data and the data of the walking profile, and/or the telematics data and the baseline operation data. In embodiments, the level of impairment may have a metric, value, or the like, that may have an associated scale. For example, the level of impairment may range from "1" (i.e., not impaired) to "10" (i.e., severely impaired).

The processor 219 may determine (238) if the level of impairment exceeds a threshold value. For example, if the level of impairment is a "5" on a scale of 1-10 and the threshold value is "4", the level of impairment exceeds the threshold value. If the level of impairment does not exceed the threshold value ("NO"), processing may end, repeat, or proceed to other functionality.

If the level of impairment does exceed the threshold value ("YES"), the processor 219 may generate (240) a message that may include various information. In embodiments, the various information may indicate the estimated level of impairment and/or an indication that the user may be impaired. In an implementation, the message may further indicate that alternative transportation may be available, such as through public transportation, a ride sharing service, a taxi service, a carpool, and/or other means of transportation. Generally, the message may include content and information that is intended to dissuade the individual from operating the vehicle. The processor 219 may then cause display (242) of the message, such as via a user interface of the electronic device 210. It should be appreciated that the processor 219 may cause the message to be displayed either before the user operates the vehicle or during operation of the vehicle.

The processor 219 may facilitate (244) the arrangement of alternative transportation for the individual. In particular, the processor 219 may inquire as to the availability of alternative transportation, such as availability of ride share drivers, timetables of public transportation based on device location, and/or other data. In some implementations, the processor 219 may facilitate the alternative transportation if the determined level of impairment at least meets a certain threshold value (e.g., a 7 on a scale of 1-10). In facilitating the alternative transportation, the processor 219 may interface and communicate with the remote server(s) 215. In particular, the remote server(s) 215 may be associated with ride sharing company(ies), public transportation companies, and/or mapping servers having access to alternative transportation data.

The processor 219 may optionally display (246) an indication of the alternative transportation, such as via a user interface of the electronic device 210. In embodiments, the electronic device 210 may enable the individual to confirm the alternative transportation or otherwise make selections, such as requesting a ride share or purchasing tickets for public transportation. In an implementation, the processor 219 may automatically facilitate and request alternative transportation for the individual without input from the individual. For example, the processor 219 may interface with a server associated with a ride sharing service, and may present, in a user interface of the electronic device 210, an indication of an available ride sharing vehicle. The individual may review the presented information and may select, via the user interface, to request the ride sharing vehicle, or the processor 219 may automatically "book" the alternative transportation.

Figure 3:
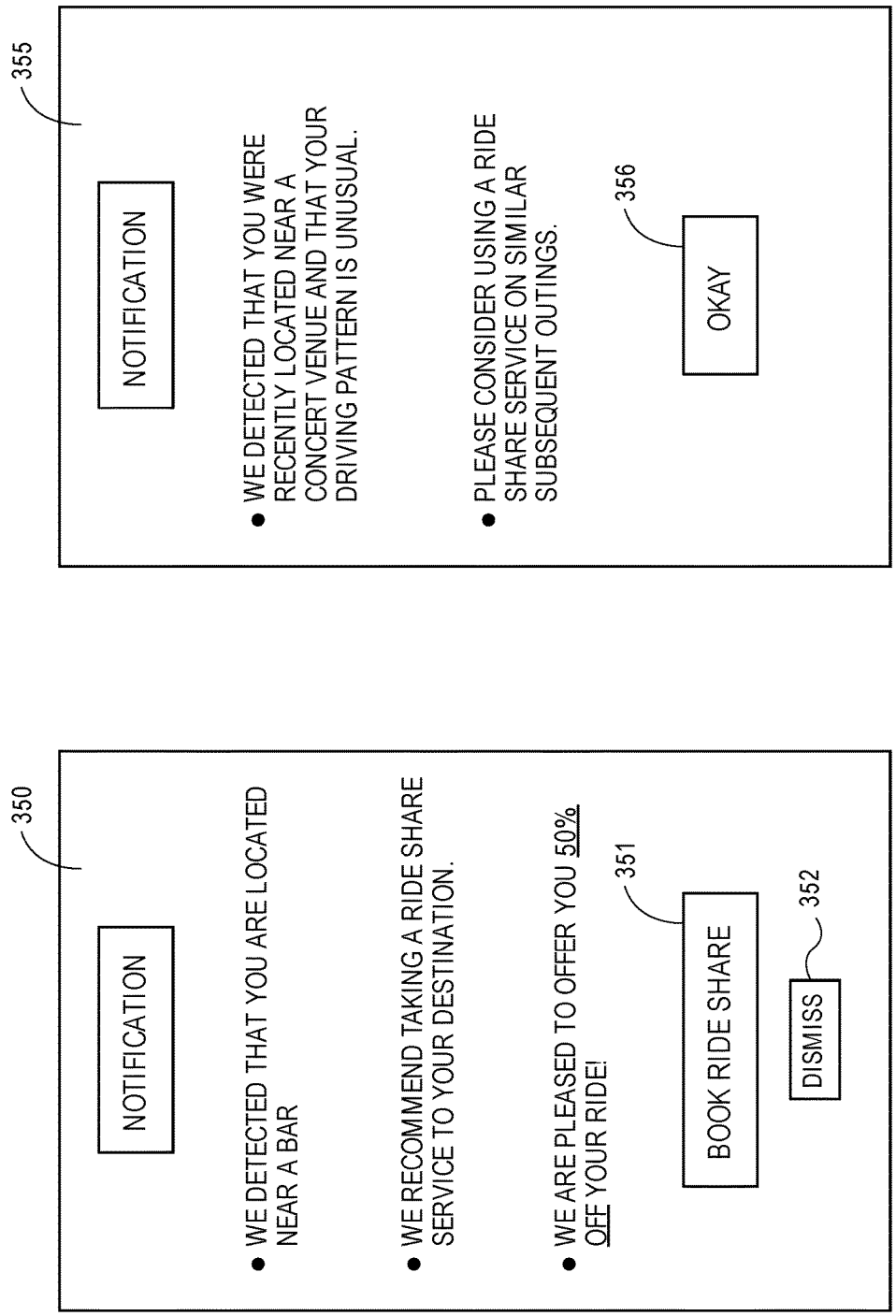
FIGS. 3A and 3B depict user interfaces associated with example notifications, in accordance with some embodiments.

FIGS. 3A and 3B illustrate interfaces including example notifications. An electronic device (e.g., a mobile device, such as a smartphone) may be configured to display the interfaces and/or receive selections and inputs via the interfaces, where the electronic device may be associated with an operator of a vehicle, or may be integrated into the vehicle. For example, a dedicated application that is configured to operate on the electronic device may display the interfaces. It should be appreciated that the interfaces are merely examples and that alternative or additional content is envisioned.

FIG. 3A illustrates an interface 350 that includes various information associated with a user's circumstance and level of impairment. In particular, the interface 350 indicates that the user is located near a bar and recommends that the user take a ride share service to his/her destination. Additionally, the interface 350 indicates an offer for a 50% discount for the ride.

The interface 350 may include a book selection 351 that, upon selection by the user, may cause the electronic device to request a ride share at a location of the electronic device. The interface 350 may further include a dismiss selection 352 that, upon selection by the user, may cause the electronic device to dismiss the interface 350.

FIG. 3B illustrates an interface 355 that includes various information associated with a circumstance and level of impairment of another user. In particular, the interface 355 indicates that the user was recently located near a concert venue and that the user's detected driving pattern is unusual (i.e., differs from the user's normal driving pattern). The interface 355 recommends that the user consider using a ride share service on similar subsequent outings. Further, the interface may include an okay selection 356 that, upon selection by the user, may cause the electronic device to dismiss the interface 355.

Figure 4:
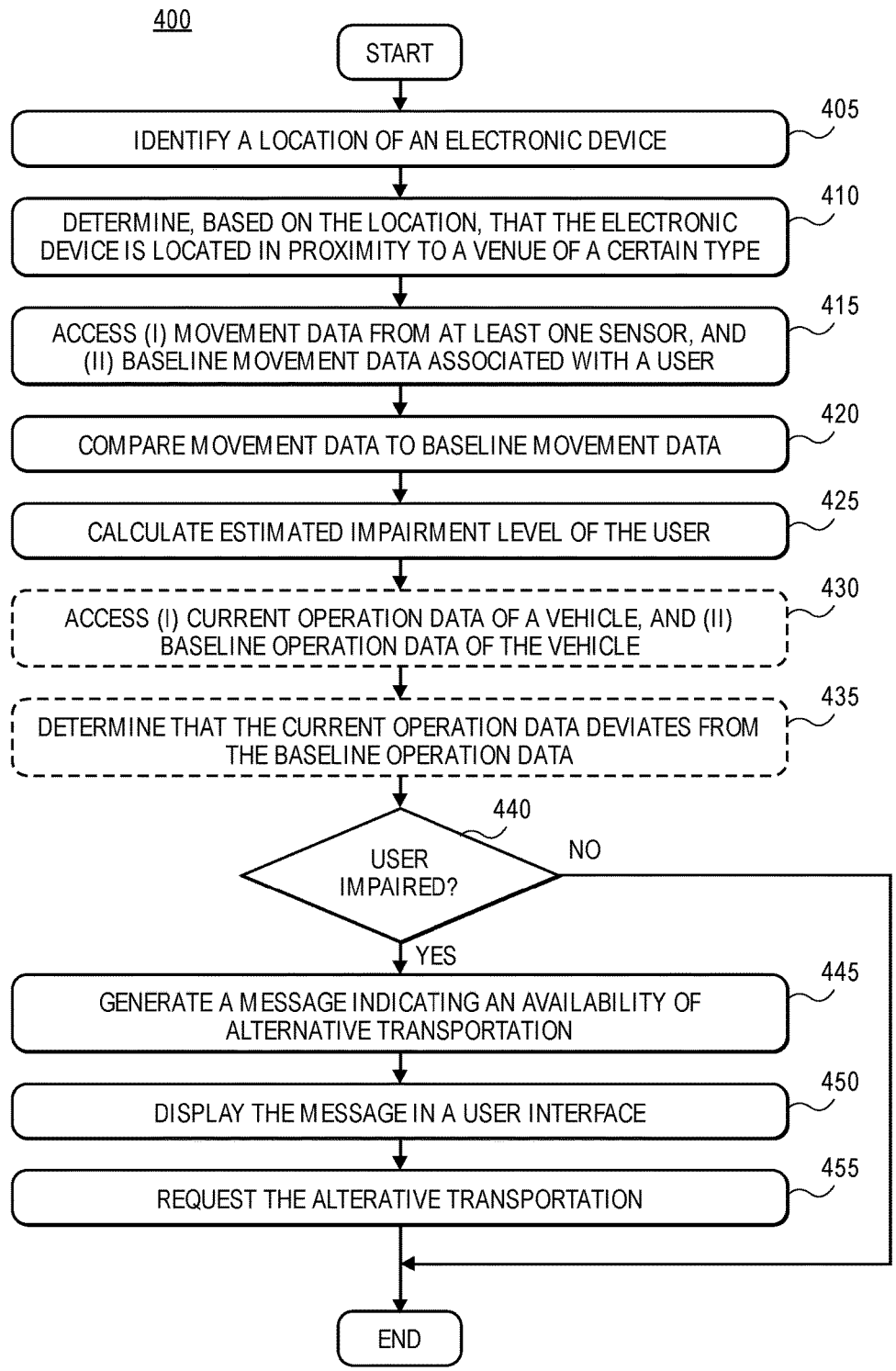
FIG. 4 depicts an exemplary flow diagram associated with collecting and analyzing sensor data, and facilitating alternative transportation, in accordance with some embodiments.

FIG. 4 depicts is a block diagram of an exemplary method 400 of facilitating transportation for a user. The method 400 may be facilitated by an electronic device such as the electronic device 210 as discussed with respect to FIG. 2. The electronic device may support execution of a dedicated application that may facilitate the functionalities of the method 400. Further, the electronic device may enable the user to make various selections and facilitate various functionalities.

The method 400 may begin when the electronic device identifies (block 405) its location. In embodiments, the electronic device may identify its location in the form of GPS coordinates from a location module. The electronic device may further determine (block 410), based on the location, that the electronic device is located in proximity to a venue of a certain type. In embodiments, the electronic device may interface with a remote server to retrieve, based on the location, an indication of the venue and operationally information associated with the venue (e.g., type of venue, business hours, etc.). The venue may have a certain type such as, for example, a bar, restaurant, concert venue, convention space, etc.

In embodiments, the electronic device may access previous location data corresponding to a set of previous locations of the electronic device, and may determine, based on the previous location data, that the electronic device is located in proximity to the venue, such as within a certain radius of the venue. For example, the previous location data and the location may indicate that the electronic device (and by extension, the user) were located in a certain bar for a period of time. It should be appreciated that the electronic device may deem that it is located in proximity to the venue when the distance between the location of the electronic device and a location of the venue is below a threshold distance.

The electronic device may access (block 415) (i) movement data from at least one sensor, and (ii) baseline movement data associated with the user. In embodiments, the at least one sensor may include one or more of an accelerometer, a gyrosensor, a force sensor, a strain gauge, an inclinometer, and a goniometer. Further, the baseline movement data may be reflective of a stored movement profile of the user, such as a baseline gait profile of the user. The electronic device may compare (block 420) the movement data to the baseline movement data. In embodiments, a degree of difference between the movement data and the baseline movement data may reflect a degree of impairment of the user (i.e., the more the movement of the user differs from the baseline movement of the user, the more the user may be impaired). Based on the comparison of block 420, the electronic device may calculate (block 425) an estimated impairment level of the user. It should be appreciated that the estimated impairment level may be a numeric calculation based on a certain scale (e.g., on a scale of 1-10).

In a certain scenario, the user may enter a vehicle and begin operating the vehicle. In an optional implementation, the electronic device may access (block 430) (i) current operation data of the vehicle and (ii) baseline operation data of the vehicle. In embodiments, the electronic device may access the current operation data and the baseline operation data directly or via another electronic device, such as an OBD of the vehicle. The baseline operation data may be reflective of a stored vehicle operation profile of the user. The electronic device may optionally determine (block 435) that the current operation data deviates from the baseline operation data. In embodiments, a degree of difference between the current operation data and the baseline operation data may reflect a degree of impairment of the user (i.e., the more the current operation data differs from the baseline operation data, the more the user may be impaired).

The electronic device may determine (block 440) whether the user is impaired. In embodiments, the electronic device may determine whether the user is impaired based on the estimated impairment level calculated at block 425 and optionally on the comparison of the current operation data to the baseline operation data of block 435. The electronic device may compare a calculated metric (e.g., the estimated impairment level) to a threshold value, and if the calculated metric exceeds the threshold value, then the electronic device may deem that the user is impaired ("YES") and processing may proceed to block 445. Conversely, if the calculated metric does not exceed the threshold value, then the electronic device may deem that the user is not impaired ("NO"). If the electronic device deems that the user is not impaired, processing may end, repeat, or proceed to other functionality.

At block 445, the electronic device may generate a message indicating an availability of alternative transportation. In embodiments, the electronic device may interface with a remote server to access potential alternative transportation and the availability thereof. In an implementation, the electronic device may determine a discount amount for the alternative transportation. The electronic device may display (block 450) the message in a user interface of the electronic device to enable the user to review the message. In embodiments, the message may indicate the availability of alternative transportation and may enable the user to request the alternative transportation.

The electronic device may also request (block 455) the alternative transportation. In particular, the user of the electronic device may select, via the user interface, to request the alternative transportation, in which case the electronic device may interface with the remote server to facilitate requesting the alternative transportation.

Figure 5:
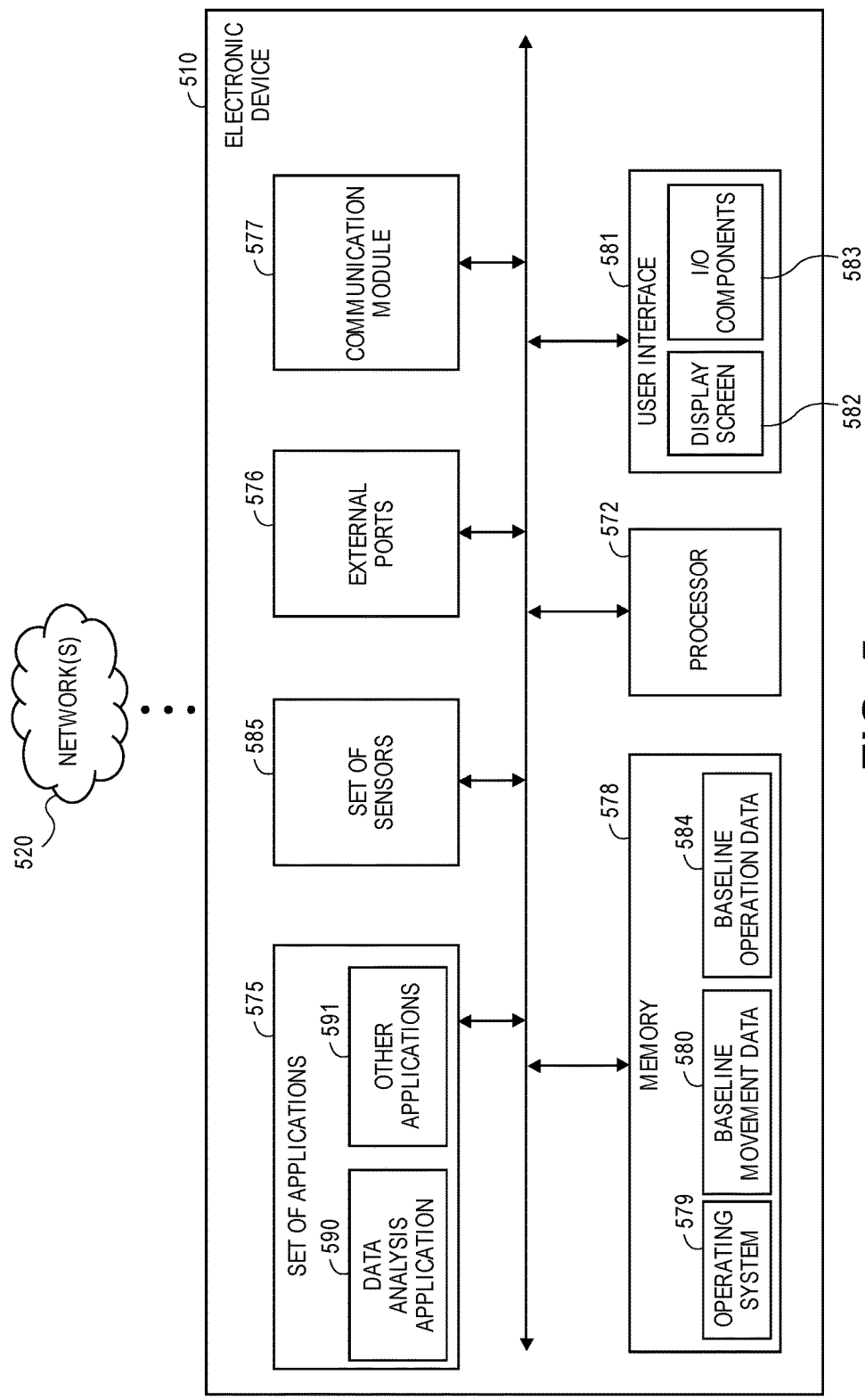
FIG. 5 is a block diagram of an exemplary electronic device, in accordance with some embodiments.

FIG. 5 illustrates a diagram of an exemplary electronic device 510 (such as the electronic device 210 as discussed with respect to FIG. 2) in which the functionalities as discussed herein may be implemented. It should be appreciated that the electronic device 510 may be configured to connect to an on-board telematics platform of a vehicle or another device associated with the vehicle, as discussed herein.

The electronic device 510 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be a data analysis application 590 configured to analyze user movement data as well as vehicle telematics data. It should be appreciated that one or more other applications 591 are envisioned, such as an application configured to facilitate alternative transportation.

The processor 572 may interface with the memory 578 to execute the operating system 579 and the set of applications 575. According to some embodiments, the memory 578 may also include baseline movement data 580 associated with a user of the electronic device 510 and baseline operation data 584 associated with the vehicle. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 510 may further include a communication module 577 configured to communicate data via one or more networks 520. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 520, data or information associated with a set of venues. For further example, the communication module 577 may facilitate, via the network(s) 520, the arrangement of alternative transportation.

The electronic device 510 may further include a set of sensors 585. The processor 572 and the set of applications 575 may interface with the set of sensors 585 to retrieve and process the corresponding sensor data. The set of sensors 585 may include, for example, a location module, an accelerometer, a gyrosensor, a force sensor, a strain gauge, an inclinometer, a goniometer, an image sensor, an ignition sensor, a clock, speedometer, a torque sensor, a throttle position sensor, a compass, a yaw rate sensor, a tilt sensor, a steering angle sensor, a brake sensor, and/or other sensors. In one particular implementation, the data analysis application 590 may use various data from the set of sensors 585 to facilitate certain functionalities.

The electronic device 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the electronic device 510 via the user interface 581 to review information and/or perform other functions. In some embodiments, the electronic device 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 572 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method in an electronic device of facilitating transportation, the method comprising:
   identifying a location of the electronic device;
   determining, based on the location of the electronic device, that the electronic device is located in proximity to a venue of a certain type;
   accessing movement data associated with a user of the electronic device from at least one sensor of the electronic device;
   retrieving, from a server remote from the electronic device via a network connection, a walking profile indicative of a normal gait of the user;
   determining, from the movement data, a current gait of the user;
   determining that the current gait of the user deviates from the normal gait of the user indicated in the walking profile;
   in response to determining that the current gait deviates from the normal gait, generating a message indicating an availability of alternative transportation; and
   displaying the message in a user interface of the electronic device of the user.

2. The computer-implemented method of claim 1, further comprising:
   receiving, via the user interface, a selection of the alternative transportation; and
   requesting the alternative transportation.

3. The computer-implemented method of claim 2, wherein requesting the alternative transportation comprises:
   interfacing with a remote server to request the alternative transportation.

4. The computer-implemented method of claim 1, wherein determining that the current gait deviates from the normal gait comprises:
   comparing the current gait to the normal gait to determine a deviation level;
   calculating, based on the deviation level, an estimated impairment level of the user of the electronic device; and
   determining that the estimated impairment level of the user exceeds a threshold value.

5. The computer-implemented method of claim 1, wherein accessing the movement data from the at least one sensor of the electronic device comprises:
   accessing the movement data from at least one of an accelerometer, gyrosensor, a force sensor, a strain gauge, an inclinometer, or a goniometer.

6. The computer-implemented method of claim 1, further comprising:
   determining a discount amount for the alternative transportation;
   wherein generating the message comprises:
   generating the message indicating the availability of the alternative transportation and the discount amount for the alternative transportation.

7. The computer-implemented method of claim 1, further comprising:
   accessing (i) current operation data of a vehicle associated with the user and (ii) baseline operation data of the vehicle; and
   determining that the current operation data deviates from the baseline operation data.

8. The computer-implemented method of claim 7, wherein generating the message indicating the availability of the alternative transportation is further in response to determining that the operation data deviates from the baseline operation data.

9. The computer-implemented method of claim 1, wherein determining that the electronic device is located in proximity to the venue of the certain type comprises:
   transmitting the location of the electronic device to a remote server; and
   receiving, from the remote server, an indication of the venue.

10. The computer-implemented method of claim 1, wherein determining that the electronic device is located in proximity to the venue of the certain type comprises:
   accessing previous location data corresponding to a set of previous locations of the electronic device; and determining, based on the previous location data and the location of the electronic device, that the electronic device is located in proximity to the venue of the certain type.

11. An electronic device for facilitating transportation, comprising:
a location module configured to generate location data;
a set of sensors configured to generate movement data associated with a user of the electronic device;
a user interface;
a transceiver configured to communicate via a network connection;
a memory configured to store non-transitory computer executable instructions; and
a processor interfacing with the location module, the set of sensors, the user interface, the transceiver, and the memory, wherein the processor is configured to execute the non-transitory computer executable instructions to cause the processor to:
identify, from the location data generated by the location module, a location of the electronic device,
determine, based on the location of the electronic device, that the electronic device is located in proximity to a venue of a certain type,
access the movement data from the set of sensors,
retrieve, from a server remote from the electronic device via the transceiver, a walking profile indicative of a normal gait of the user,
determine, from the movement data, a current gait of the user,
determine that the current gait of the user deviates from the normal gait of the user indicated in the walking profile,
in response to determining that the current gait deviates from the normal gait, generate a message indicating an availability of alternative transportation, and
cause the user interface to display the message.

12. The electronic device of claim 11, wherein the processor is further configured to:
receive, via the user interface, a selection of the alternative transportation, and
request the alternative transportation.

13. The electronic device of claim 12, further comprising:
a transceiver configured to communicate via a network connection;
wherein to request the alternative transportation, the processor is configured to:
interface, via the transceiver, with a remote server to request the alternative transportation.

14. The electronic device of claim 11, wherein to determine that the current gait deviates from the normal gait, the processor is configured to:
compare the current gait to the normal gait to determine a deviation level,
calculate, based on the deviation level, an estimated impairment level of the user of the electronic device, and
determine that the estimated impairment level of the user exceeds a threshold value.

15. The electronic device of claim 11, wherein the set of sensors includes at least one of an accelerometer, a gyrosensor, a force sensor, a strain gauge, an inclinometer, and a goniometer.

16. The electronic device of claim 11, wherein the processor is further configured to:
determine a discount amount for the alternative transportation;
and wherein to generate the message, the processor is configured to:
generate the message indicating the availability of the alternative transportation and the discount amount for the alternative transportation.

17. The electronic device of claim 11, wherein the memory is further configured to store baseline operation data of a vehicle associated with the user;
and wherein the processor is further configured to:
access (i) current operation data of the vehicle and (ii) baseline operation data of the vehicle, and
determine that the current operation data deviates from the baseline operation data.

18. The electronic device of claim 17, wherein the processor generates the message indicating the availability of the alternative transportation in response to determining that the operation data deviates from the baseline operation data.

19. The electronic device of claim 11,
wherein to determine that the electronic device is located in proximity to the venue of the certain type, the processor is configured to:
transmit, via the transceiver, the location of the electronic device to a remote server, and
receive, from the remote server via the transceiver, an indication of the venue.

20. The electronic device of claim 11, wherein to determine that the electronic device is located in proximity to the venue of the certain type, the processor is configured to:
access previous location data corresponding to a set of previous locations of the electronic device, and
determine, based on the previous location data and the location of the electronic device, that the electronic device is located in proximity to the venue of the certain type.

* * * * *